US012767784B2

(12) United States Patent
Yamamoto et al.

(10) Patent No.: US 12,767,784 B2
(45) Date of Patent: Oct. 20, 2026

(54) RESIN COMPOSITION, FILM AND CURED PRODUCT

(71) Applicant: Showa Denko Materials Co., Ltd., Tokyo (JP)

(72) Inventors: Takaya Yamamoto, Tokyo (JP); Saori Mizunoe, Tokyo (JP); Shota Umezaki, Tokyo (JP); Masaki Takeuchi, Tokyo (JP); Yasuhisa Ishida, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 1233 days.

(21) Appl. No.: 17/442,010

(22) PCT Filed: Mar. 25, 2020

(86) PCT No.: PCT/JP2020/013448

§ 371 (c)(1),
(2) Date: Sep. 22, 2021

(87) PCT Pub. No.: WO2020/196664

PCT Pub. Date: Oct. 1, 2020

(65) Prior Publication Data

US 2022/0177670 A1 Jun. 9, 2022

(30) Foreign Application Priority Data

Mar. 27, 2019 (JP) ................................ 2019-061202

(51) Int. Cl.

| | |
|---|---|
| ***C08K 3/01*** | (2018.01) |
| ***C08J 5/18*** | (2006.01) |
| ***C08K 3/22*** | (2006.01) |
| ***C08K 5/5435*** | (2006.01) |
| ***C08K 5/544*** | (2006.01) |

(52) U.S. Cl.

CPC .................. *C08K 3/01* (2018.01); *C08J 5/18* (2013.01); *C08K 3/22* (2013.01); *C08K 5/5435* (2013.01); *C08K 5/544* (2013.01); *C08J 2379/08* (2013.01); *C08K 2201/005* (2013.01)

(58) Field of Classification Search

CPC .......... C08K 3/01; C08K 3/22; C08K 5/5435; C08K 5/544; C08K 2201/005; C08J 5/18; C08J 2379/08

See application file for complete search history.

(56) References Cited

U.S. PATENT DOCUMENTS

| | | | |
|---|---|---|---|
| 2004/0046568 A1 | 3/2004 | Unsworth | |
| 2009/0243436 A1 | 10/2009 | Rubinsztajn | |
| 2013/0310486 A1 | 11/2013 | Kawakusu | |
| 2015/0250052 A1* | 9/2015 | Ohkoshi | ................ C09J 163/00 156/247 |

FOREIGN PATENT DOCUMENTS

| | | | | |
|---|---|---|---|---|
| CN | 101544832 A | | 9/2009 | |
| CN | 108752827 A | * | 11/2018 | ............ B32B 27/20 |
| JP | 59-70960 A | | 4/1984 | |
| JP | 2001-285996 A | | 10/2001 | |
| JP | 2002-038022 A | | 2/2002 | |
| JP | 2003-007451 A | | 1/2003 | |
| JP | 2003-310608 A | | 11/2003 | |
| JP | 2006-160934 A | | 6/2006 | |
| JP | 2007-175330 A | | 7/2007 | |
| JP | 2010-040743 A | | 2/2010 | |
| JP | 2011-001400 A | | 1/2011 | |
| JP | 2013-135592 A | | 7/2013 | |
| JP | 2014-165370 A | | 9/2014 | |
| JP | 2015-089903 A | | 5/2015 | |
| JP | 2016-146515 A | | 8/2016 | |
| JP | 2018-074529 A | | 5/2018 | |
| JP | 2019-017501 A | | 2/2019 | |
| JP | 2019044081 A | * | 3/2019 | |
| JP | 2019166688 A | * | 10/2019 | .......... B32B 15/092 |
| WO | 2016/125702 A1 | | 8/2016 | |

OTHER PUBLICATIONS

English machine translation of JP 2019-044081 (Year: 2019).*
English machine translation of JP 2019-166688 (Year: 2019).*
Bismuth titanate data sheet (Year: 2025).*
English machine translation of CN 108752827 (Year: 2018).*

* cited by examiner

*Primary Examiner* — Angela C Scott

(74) *Attorney, Agent, or Firm* — FITCH, EVEN, TABIN & FLANNERY, LLP

(57) ABSTRACT

A resin composition includes an insulating filler having a specific gravity of 6.0 or higher; and a resin having a polar group, in which a content of the insulating filler having a specific gravity of 6.0 or higher is 50% by volume or more with respect to a total solid content of the resin composition.

20 Claims, No Drawings

RESIN COMPOSITION, FILM AND CURED PRODUCT

CROSS-REFERENCE TO RELATED APPLICATIONS

This application is a U.S. national phase application filed under 35 U.S.C. § 371 of International Application No. PCT/JP2020/013448, filed Mar. 25, 2020, designating the United States, which claims priority from Japanese Patent Application No. 2019-061202, filed Mar. 27, 2019, the entire contents of each of which are hereby incorporated herein by reference.

TECHNICAL FIELD

The present disclosure relates to a resin composition, a film and a cured product.

BACKGROUND ART

Ultrasound reflection materials are used for diagnostic ultrasound medical devices, inter-vehicle distance detection systems, obstacle detection, buried pipe corrosion checkers, concrete crack detection, acoustic materials for earphones or speakers and the like, and noise reduction, improvement in definition, simplification of the systems and the like have been desired for these ultrasound reflection materials (for example, Patent Document 1).

RELATED ART DOCUMENT

Patent Document

[Patent Document 1] Japanese Patent Application Laid-Open (JP-A) No. 2019-017501

SUMMARY OF INVENTION

Technical Problem

Ultrasonic signals are sometimes reflected at interfaces between different materials and interacted with by transmitted signals. The interaction between the transmitted signals and the reflected signals can enhance the ultrasonic signals. The reflection of ultrasonic signals occurs owing to the differences in acoustic impedance, which is defined as a product of the density and the speed of the sound, between different materials. Accordingly, it is presumed that materials having a high specific gravity (i.e., high density), for example, can be used as ultrasound reflection materials for enhancing ultrasonic signals. Further, such materials having a high specific gravity are desired to have insulating property to prevent conduction, and to have adhesiveness to the base material.

In view of the foregoing situation, the present disclosure is directed to providing a resin composition capable of forming an insulating layer having a high specific gravity and excellent adhesiveness to a base material, and a film and a cured product obtained using the resin composition.

Solution to Problem

Means for solving the above problems include the following aspects.

(1) A resin composition including:

an insulating filler having a specific gravity of 6.0 or higher; and a resin having a polar group, wherein a content of the insulating filler having a specific gravity of 6.0 or higher is 50% by volume or more with respect to a total solid content of the resin composition.

(2) The resin composition according to (1), wherein the resin having a polar group includes a resin having a weight-average molecular weight of 10,000 or more.

(3) The resin composition according to (1) or (2), wherein the polar group includes at least one hetero atom selected from the group consisting of a nitrogen atom, an oxygen atom and a sulfur atom.

(4) The resin composition according to any one of (1) to (3), wherein the resin having a polar group includes at least one selected from the group consisting of a polyamide-imide resin, an epoxy resin, an acrylic resin, a polyester resin and a polyether resin.

(5) The resin composition according to any one of (1) to (4), wherein a volume-average particle size of the insulating filler having a specific gravity of 6.0 or higher is 5.0 μm or less.

(6) The resin composition according to any one of (1) to (5), wherein the insulating filler having a specific gravity of 6.0 or higher includes at least one selected from the group consisting of bismuth oxide, cerium oxide, barium titanate and tungsten oxide.

(7) The resin composition according to any one of (1) to (6), further including a coupling agent.

(8) The resin composition according to (7), wherein the coupling agent includes a silane coupling agent.

(9) The resin composition according to any one of (1) to (8), further including a solvent.

(10) A film formed by drying the resin composition according to any one of (1) to (9).

(11) The film according to (10), wherein the film has a maximum height Rz of 10.0 μm or less.

(12) The film according to (10) or (11), wherein the film has an arithmetic average roughness Ra of 1.5 μm or less.

(13) The film according to any one of (10) to (12), wherein the film is for use as an ultrasound reflection material.

(14) A cured product formed by curing the resin composition according to any one of (1) to (9).

(15) The cured product according to (14), wherein the cured product has a maximum height Rz of 10.0 μm or less.

(16) The cured product according to (14) or (15), wherein the cured product has an arithmetic average roughness Ra of 1.5 μm or less.

(17) The cured product according to any one of (14) to (16), wherein the cured product is for use as an ultrasound reflection material.

Advantageous Effects of Invention

According to the present disclosure, a resin composition capable of forming an insulating layer having a high specific gravity and an excellent adhesiveness to a base material, and a film and a cured product obtained using the resin composition are provided.

DESCRIPTION OF EMBODIMENTS

Embodiments for carrying out the invention will be described below in detail. However, the invention is not limited to the following embodiments. In the following embodiments, components (including elemental steps, etc.) thereof are not essential unless otherwise specified. The same applies to numerical values and ranges, which do not limit the invention.

In the present disclosure, the term "step" encompasses an independent step separated from other steps as well as a step that is not clearly separated from other steps, as long as a purpose of the step can be achieved.

In the present disclosure, a numerical range specified using "(from) . . . to . . . " represents a range including the numerical values noted before and after "to" as a minimum value and a maximum value, respectively.

In the numerical ranges described in a stepwise manner in the present disclosure, the upper limit value or the lower limit value described in one numerical range may be replaced with the upper limit value or the lower limit value of another numerical range described in a stepwise manner. Further, in the numerical ranges described in the present disclosure, the upper limit value or the lower limit value of the numerical ranges may be replaced with the values shown in the Examples.

In the present disclosure, each component may include plural substances corresponding to the component. In a case in which plural substances corresponding to respective components are present in a composition, an amount or content of each component means the total amount or content of the plural substances present in the composition unless otherwise specified.

In the present disclosure, each component may include plural kinds of particles corresponding to the component. In the case in which plural kinds of particles corresponding to respective components are present in a composition, a particle diameter of the component means a value with respect to the mixture of the plural kinds of particles present in the composition, unless otherwise specified.

The term "layer" or "film" as used herein encompasses, when a region in which the layer or the film is present is observed, not only a case in which the layer is formed over the entire observed region, but also a case in which the layer is formed at only a part of the observed region.

<<Resin Composition>>

The resin composition according to the present disclosure contains: an insulating filler having a specific gravity of 6.0 or higher; and a resin having a polar group, wherein a content of the insulating filler having a specific gravity of 6.0 or higher is 50% by volume or more with respect to the total solid content of the resin composition.

From the viewpoint of ease of handling, the resin composition preferably has a viscosity at 25° C. of from 10 Pa·s to 300 Pa·s, more preferably from 20 Pa·s to 250 Pa·s, and further preferably from 30 Pa·s to 200 Pa·s. The viscosity of the resin composition is measured as an average value of the values from two measurements using an E-type rotational viscometer equipped with an SPP rotor after rotations at 25° C. for 144 seconds with a rotational speed of 2.5 rotations per minute (rpm), in accordance with JIS Z 3284-3:2014.

Hereinafter, the components contained in the resin composition will be described.

<Insulating Filler>

The resin composition according to the present disclosure contains an insulating filler having a specific gravity of 6.0 or higher. The content of the insulating filler having a specific gravity of 6.0 or higher is 50% by volume or more with respect to the total solid content of the resin composition.

Examples of the filler having a specific gravity of 6.0 or higher include: a metal oxide such as bismuth oxide, cerium oxide, or tungsten oxide; barium titanate, sintered uranium oxide, tungsten carbide, tungsten, and zirconium. In particular, at least one selected from the group consisting of bismuth oxide, cerium oxide, barium titanate and tungsten oxide is preferable. One type of insulating filler may be used singly, or two or more types thereof may be used in combination. In particular, bismuth oxide is preferable from the viewpoints of heat resistance, specific gravity, and less than 1% by mass of thermal weight loss when heated up to 300° C.

The insulating filler preferably has a volume resistivity at 25° C. of $1\times10^{6}$ Ω·cm or more, more preferably $1\times10^{8}$ Ω·cm or more, and further preferably $1\times10^{10}$ Ω·cm or more.

The specific gravity of the insulating filler may be adjusted as necessary in accordance with the use of the resin composition as long as the specific gravity is 6.0 or higher. For example, the specific gravity of the insulating filler may be 7.0 or higher or 8.0 or higher. The upper limit of the specific gravity of the insulating filler is not particularly limited. For example, the upper limit of the specific gravity of the insulating filler may be 10.0 or lower. In the present disclosure, the specific gravity of a filler refers to a ratio of the true density of the measurement sample to the true density of water, which is measured as a ratio of the mass of the measurement sample to the mass of pure water of the same volume under atmospheric pressure, in accordance with JIS K 0061:2001 and JIS Z 8807:2012.

From the viewpoint of stably obtaining a material having a high specific gravity, the insulating filler preferably has a small mass loss rate at high temperature. For example, the mass loss rate of the insulating filler when it is heated at 300° C. for an hour is preferably 1% by mass or less, more preferably 0.5% by mass or less, and further preferably 0.1% by mass or less.

The shape of the insulating filler is not particularly limited, and may be spherical, powdery, needle-like, fibrous, plate-like, square-shaped, polyhedral, scaly or the like. The particle size of the insulating filler is not particularly limited, and the volume-average particle size is preferably 5.0 μm or less, more preferably 4.0 μm or less, further preferably 3.0 μm or less, and particularly preferably 2.0 μm or less. The lower limit of the volume-average particle size is not particularly limited, and may be 0.001 μm or more. The volume-average particle size can be measured using a laser diffraction particle size distribution analyzer, and refers to a particle size at which the cumulative volume reaches 50% counting from particles having a smaller particle diameter in a volume-based particle size distribution (D50). In particular, the volume-average particle size of the insulating filler is preferably 2.0 μm or less, since the flatness of the film or the cured product obtained using the resin composition can be improved.

From the foregoing viewpoints, the volume average particle size of the insulating filler is preferably from 0.001 μm to 5.0 more preferably from 0.001 μm to 4.0 further preferably from 0.001 μm to 3.0 and particularly preferably from 0.001 μm to 2.0 μm.

The content of the insulating filler in the total solid content of the resin composition is 50% by volume or more, preferably 55% by volume or more, and further preferably 60% by volume or more. When the content of the insulating filler in the total solid content of the resin composition is 50% by volume or more, a sufficient specific gravity tends to be obtained when a film or a cured product is formed. The upper limit of the content of the insulating filler is not particularly limited, and from the viewpoint of ease of handling of the resin composition, the content of the insulating filler may be 80% by volume or less.

From the foregoing viewpoints, the content of the insulating filler in the total solid content of the resin composition is preferably from 50% by volume to 80% by volume, more preferably from 55% by volume to 80% by volume, and further preferably from 60% by volume to 80% by volume.

The solid content of the resin composition refers to the components other than volatile components in the resin composition.

The content of the insulating filler in the total solid content of the resin composition is preferably 88% by mass or more, more preferably 90% by mass or more, and further preferably 92% by mass or more. The upper limit of the content of the insulating filler in the total solid content of the resin composition is not particularly limited, and may be 99% by mass or less.

From the foregoing viewpoints, the content of the insulating filler in the total solid content of the resin composition is preferably from 88% by mass to 99% by mass, more preferably from 90% by mass to 99% by mass, and further preferably from 92% by mass to 99% by mass.

The resin composition may or may not contain another filler in addition to the insulating filler having a specific gravity of 6.0 or higher. For example, the resin composition may contain an insulating filler having a specific gravity of less than 6.0. When the resin composition contains a filler other than the insulating filler having a specific gravity of 6.0 or higher, the content of the insulating filler having a specific gravity of 6.0 or higher with respect to the total mass of the filler is preferably 60% by mass or more, more preferably 70% by mass or more, and further preferably 80% by mass or more.

When the resin composition contains a filler other than the insulating filler having a specific gravity of 6.0 or higher, the total content of the filler in the total solid content of the resin composition exceeds 50% by volume, and is preferably 55% by volume or more, more preferably 60% by volume or more, and further preferably 65% by volume or more. The upper limit of the total content of the filler in the total solid content of the resin composition in this case is not particularly limited, and may be 90% by volume or less.

When the resin composition contains a filler other than the insulating filler having a specific gravity of 6.0 or higher, the total content of the filler in the total solid content of the resin composition is preferably 90% by mass or more, preferably 92% by mass or more, and further preferably 94% by mass or more. The upper limit of the total content of the filler in the total solid content of the resin composition in this case is not particularly limited, and may be 99% by mass or less.

<Resin>

The resin composition according to the present disclosure contains a resin. The resin composition according to the present disclosure contains an insulating filler at a content of 50% by volume or more to form a composition having a high specific gravity. However, a high content of the insulating filler tends to impede sufficient adhesion of the formed film or cured product to the base material. The resin composition according to the present disclosure employs a resin having a polar group to improve interactions with the base material, thereby enabling to achieve both adhesiveness and a high specific gravity.

A polar group refers to a group of atoms having polarity owing to a bond between atoms having different electronegativities. Examples of the polar group include a group having a hetero atom other than a carbon atom and a hydrogen atom, and more specifically include a group having at least one hetero atom selected from the group consisting of a nitrogen atom, an oxygen atom, a sulfur atom, a boron atom, a phosphorous atom and a silicon atom. In particular, the polar group is preferably a group having at least one hetero atom selected from the group consisting of a nitrogen atom, an oxygen atom and a sulfur atom. More specifically, examples of the polar group include an amino group, an amide group, an imide group, a cyano group, a nitro group, a hydroxy group, a carboxy group, a carbonyl group, a thiol group, a sulfo group, a thionyl group, an ester bond, an ether bond, a sulfide bond, a urethane bond and a urea bond, and at least one selected from the group consisting of an amide group, an imide group, a hydroxy group, an amino group, a carboxy group, a carbonyl group and a urea bond is preferable. The polar group may be present in the main chain or a side chain of the resin.

The type of resin having a polar group is not particularly limited as long as it has a polar group. The resin may be a thermosetting resin, a thermoplastic resin or a combination thereof. A thermoplastic resin is preferable from the viewpoint that the degree of shrinkage upon curing is small, and further, a combination of a thermoplastic resin and a thermosetting resin is more preferable from the viewpoints of improving the strength of the film after film formation and suppressing the shrinkage upon curing during the curing process.

The resin component may be in the form of a monomer having a functional group capable of causing a polymerization reaction by heating, or may be in the form of a polymer that has undergone polymerization. Specific examples of the resin having a polar group include a vinyl polymerization resin having a polar group, an acrylic resin, a polyamide resin, a polyimide resin, a polyamide-imide resin, a polyurethane resin, a polyester resin, a polyether resin, an epoxy resin, an oxazine resin, bismaleimide resin, phenol resin, unsaturated polyester resin and silicone resin. In particular, at least one selected from the group consisting of a polyamide-imide resin, an epoxy resin, an acrylic resin, a polyester resin and a polyether resin is preferable. One type of resin may be used singly, or two or more types thereof may be used in combination.

In particular, a polyamide resin is preferable from the viewpoint of adhesiveness, and an epoxy resin is preferable from the viewpoint of heat resistance. From the viewpoint of achieving both heat resistance and adhesiveness, a polyamide-imide resin and an epoxy resin may be used in combination. In the case in which a polyamide resin and an epoxy resin are used in combination in the resin composition, the mass ratio of the polyamide-imide resin to the epoxy resin is not particularly limited, and may be from 20/80 to 80/20, from 30/70 to 70/30 or from 40/60 to 60/40.

The resin having a polar group may be a resin obtained by polymerization in which a curing agent is used. For example, the resin having a polar group may be a resin obtained by polymerization in which an epoxy resin is polymerized by use of: a polyaddition-type curing agent, such as an acid anhydride curing agent, an amine curing agent, a phenol curing agent or a mercaptan curing agent; a latent curing agent, such as imidazole; or the like.

Specific examples of the epoxy resin include a bisphenol A-type epoxy resin, a bisphenol F-type epoxy resin, a bisphenol S-type epoxy resin, a hydrogenated bisphenol A-type epoxy resin, a phenol novolac-type epoxy resin, a cresol novolac-type epoxy resin, a naphthalene-type epoxy resin, a biphenol-type epoxy resin, biphenyl novolac-type epoxy resin and an alycyclic epoxy resin.

Preferable examples of the epoxy resin include epoxy resins listed above having a substituent such as an ether group or an alicyclic epoxy group. As the epoxy resin, an epoxy resin having a hetero atom other than the oxygen atom derived from the epoxy group or glycidyloxy group of the epoxy resin is preferable.

Preferable examples of the epoxy resin include an epoxy resin having a nitrogen atom and a hydrogen atom bonded to the nitrogen atom. In a preferable embodiment, the epoxy resin may have a heterocyclic structure having a nitrogen atom and a hydrogen atom bonded to the nitrogen atom. Examples of such a heterocyclic structure include a glycoluril structure.

When the resin composition contains an epoxy resin, the content of the epoxy resin with respect to the total amount of the resin may be 100% by mass, from 10% by mass to 90% by mass, from 20% by mass to 80% by mass, from 30% by mass to 70% by mass, or from 40% by mass to 60% by mass.

When the resin composition contains an epoxy resin, the content of the epoxy resin with respect to the solid content of the resin composition may be from 0.01% by mass to 10% by mass, from 0.1% by mass to 9% by mass, or from 1% by mass to 8% by mass.

As a polyamide-imide resin, a polyamide-imide resin having an amide bond and an imide bond in the main chain is preferable. Preferable specific examples of the polyamide-imide resin include a polyamide-imide resin having at least one of a polyalkylene oxide structure or a polysiloxane structure. These polyamide-imide resins are preferable from the viewpoint of relaxing stress due to deformation of the polyamide-imide resin. These polyamide-imide resins may be polyamide-imide resins synthesized using, for example, a polyalkylene oxide-modified diamine and a polysiloxane-modified diamine, respectively.

As the unit structure of the polyalkylene oxide structure that may be included in the polyamide-imide resin, an alkylene oxide structure having 1 to 10 carbon atoms is preferable, an alkylene oxide structure having 1 to 8 carbon atoms is more preferable, and an alkylene oxide structure having 1 to 4 carbon atoms is further preferable. In particular, as a polyalkylene oxide structure, a polypropylene oxide structure is preferable. The alkylene group in the alkylene oxide structure may be linear or branched. One type of unit structure may be included in the polyalkylene oxide structure, or two or more types thereof may be included in the polyalkylene oxide structure.

Examples of the polysiloxane structure that may be included in the polyamide-imide resin include a polysiloxiane structure in which alkyl groups having 1 to 20 carbon atoms or aryl groups having 6 to 18 carbon atoms are bonded as substituents to a part of or all of the silicon atoms of the polysiloxane structure.

Examples of the alkyl group having 1 to 20 carbon atoms include a methyl group, an ethyl group, an n-propyl group, an isopropyl group, an n-butyl group, a t-butyl group, an n-octyl group, a 2-ethylhexyl group and an n-dodecyl group. In particular, a methyl group is preferable.

The aryl group having 6 to 18 carbon atoms may be unsubstituted or substituted with a substituent. In the case in which the aryl group has a substituent, examples of the substituent include a halogen atom, an alkoxy group and a hydroxy group. Examples of the aryl group having 6 to 18 carbon atoms include a phenyl group, a naphthyl group and a benzyl group. In particular, a phenyl group is preferable.

One type of alkyl group having 1 to 20 carbon atoms or aryl group having 6 to 18 carbon atoms may be used singly, or two or more types thereof may be used in combination.

Examples of a preferable embodiment of the polyamide-imide resin include a polyamide-imide resin having a structural unit derived from a diimide carboxylic acid or a derivative thereof and a structural unit derived from an aromatic diisocyanate or an aromatic diamine.

The method for producing a polyamide-imide resin having a structural unit derived from a diimide carboxylic acid or a derivative thereof and a structural unit derived from an aromatic diisocyanate or an aromatic diamine is not particularly limited, and examples thereof include an isocyanate method and an acid chloride method.

In the isocyanate method, a polyamide-imide resin is synthesized using a diimide carboxylic acid and an aromatic diisocyanate. In the acid chloride method, a polyamide-imide resin is synthesized using a diimide carboxylic acid chloride and an aromatic diamine. The isocyanate method in which a polyamide-imide resin is synthesized from a diimide carboxylic acid and an aromatic diisocyanate is more preferable since it tends to allow easy optimization of the structure of the polyamide-imide resin.

In the case in which the resin composition contains a polyamide-imide resin, the content of the polyamide-imide resin with respect to the total amount of the resin may be 80% by mass or more, 90% by mass or more, or 100% by mass. The content of the polyamideimide resin with respect to the total amount of the resin may be from 10% by mass to 90% by mass, from 20% by mass to 80% by mass, from 30% by mass to 70% by mass, or from 40% by mass to 60% by mass.

In the case in which the resin composition contains a polyamide-imide resin, the content of the polyamide-imide resin with respect to the solid content of the resin composition may be from 0.01% by mass to 10% by mass, from 0.1% by mass to 9% by mass, or from 1% by mass to 8% by mass.

The weight-average molecular weight of the resin having a polar group is not particularly limited, and is preferably 10,000 or more, and may be 20,000 or more, or 50,000 or more. When the weight-average molecular weight of the resin is 10,000 or more, generation of powders on the surface of a film formed by drying the resin composition tends to be suppressed. The upper limit of the weight-average molecular weight is not particularly limited, and may be 1,000,000 or less or 900,000 or less. In a case in which the resin having a polar group contained in the resin composition is one that is to be polymerized during the formation of a film or a cured product, it is preferable that the polymerized resin has the weight-average molecular weight within the above-described ranges.

In a case in which multiple types of resins are contained in the resin composition, it is preferable that each resin independently has a weight-average molecular weight within the above ranges.

The weight-average molecular weight of the resin is measured using gel permeation chromatography with polystyrene being used as a standard material.

The content of the resin having a polar group in the resin composition is not particularly limited, and is preferably from 2% by mass to 12% by mass, more preferably from 3% by mass to 10% by mass, and further preferably from 4% by mass to 9% by mass, with respect to the solid content of the resin composition, from the viewpoint of adjusting the adhesiveness and the specific gravity.

The resin composition may contain a resin having no polar group in addition to the resin having a polar group. The content of the resin having a polar group with respect to the total amount of the resin is preferably 60% by mass or more, more preferably 70% by mass or more, further preferably 80% by mass or more, and particularly preferably 90% by mass or more.

The total content of the resin in the resin composition (i.e., the total content of the resin having a polar group and the resin having no polar group optionally present therein) may be from 0.01% by mass to 10% by mass, from 0.1% by mass to 9% by mass, or from 1% by mass to 8% by mass.

In a case in which the resin composition contains a resin having no polar group, the weight-average molecular weight of the resin having no polar group is not particularly limited, and is preferably 10,000 or more, or may be 20,000 or more or 50,000 or more. When the weight-average molecular weight of the resin is 10,000 or more, generation of powders on the surface of a film formed by drying the resin composition tends to be suppressed. The upper limit of the weight-average molecular weight is not particularly limited, and may be 1,000,000 or less, or 900,000 or less. In a case in which the resin having no polar group contained in the resin composition is one that is to be polymerized during the formation of a film or a cured product, it is preferable that the polymerized resin has the weight-average molecular weight within the above-described ranges.

In a case in which multiple types of resins are contained in the resin composition, it is preferable that each resin independently has a weight-average molecular weight within the above ranges.

In a case in which the resin composition contains both a resin having a weight-average molecular weight of 10,000 or more and a resin having a weight-average molecular weight of less than 10,000, the content of the latter is preferably 30% by mass or less, more preferably 20% by mass or less, and further preferably 10% by mass or less, with respect to the entire resin. In a case in which the resin in the resin composition is one that is to be polymerized to form a film or a cured product, it is preferable that the content of the resin having a weight-average molecular weight of 10,000 or less in the resin composition after the polymerization of the resin is within the above-described ranges.

In the case in which the resin composition contains a thermosetting resin, the resin composition may further contain a curing agent. For example, in the case in which an epoxy resin is used as a thermosetting resin, examples of the curing agent include: a polyaddition-type curing agent, such as an acid anhydride curing agent, an amine curing agent, a phenol curing agent or a mercaptan curing agent; or a latent curing agent, such as imidazole; and the like.

The content of the curing agent may be from 0.1% by mass to 50% by mass, from 1% by mass to 30% by mass, from 1% by mass to 20% by mass, or from 1% by mass to 10% by mass, with respect to the total solid content of the resin composition.

In a case in which the curing agent is an polyaddition-type curing agent curing agent, the ratio of the number of equivalents of the functional group of the thermosetting resin to the number of equivalents of the functional group of the curing agent reactive with the functional group of the thermosetting resin (the number of equivalents of the functional group of the thermosetting resin: the number of equivalents of the functional group of the curing agent) may be from 1:1 to 1:3 or from 1:1 to 1:2.

<Coupling Agent>

The resin composition may contain a coupling agent. In the case in which the resin composition contains a coupling agent, adhesiveness of the film or the curing product to the base material tends to be further improved.

The type of coupling agent is not particularly limited, and examples of the coupling agent include a silane compound, a titanium compound, an aluminum chelate compound and an aluminum/zirconium compound. In particular, a silane coupling agent is preferable from the viewpoint of adhesiveness to a base material such as glass. One type of coupling agent may be used singly, or two or more types thereof may be used in combination.

Examples of the silane coupling agent include a silane coupling agent having a vinyl group, an epoxy group, a methacrylic group, an acrylic group, an amino group, an isocyanurate group, a ureido group, a mercapto group, an isocyanate group, an acid anhydride group or the like. In particular, a silane coupling agent having an epoxy group or an amino group is preferable, and a silane coupling agent having an epoxy group or an anilino group is more preferable. In particular, in a case in which at least one selected from the group consisting of polyamide-imide resin and epoxy resin is used as the resin, it is preferable that a silane coupling agent having an epoxy group or an amino group is used, and it is more preferable that a silane coupling agent having an epoxy group or an anilino group is used, from the viewpoint of good miscibility with the polyamide-imide resin and the epoxy resin.

Specific examples of the silane coupling agent include 3-glycidoxypropyltrimethoxysilane, 3-glycidoxypropyltriethoxysilane, 3-glycidoxypropylmethyldiethoxysilane, and 3-glycidoxypropylmethyldimethoxysilane, 2-(3,4-epoxycyclohexyl)ethyltrimethoxysilane, 3-aminopropyltriethoxysilane, 3-aminopropyltrimethoxysilane, N-2-(aminoethyl)-3-aminopropylmethyldimethoxysilane, N-2-(aminoethyl)-3-aminopropyltrimethoxysilane, N-phenyl-3-aminopropyltrimethoxysilane, 3-mercaptopropyltrimethoxysilane, 3-mercaptopropyltriethoxysilane and 3-ureidopropyltriethoxysilane.

In the case in which the resin composition contains a coupling agent, the content of the coupling agent in the resin composition is not particularly limited, and is preferably from 0.05% by mass to 5% by mass, and more preferably from 0.1% by mass to 2.5% by mass, with respect to the solid content of the resin composition.

<Solvent>

The resin composition may contain a solvent from the viewpoint of adjusting the viscosity. The solvent is preferably a solvent having a boiling point of 100° C. or higher from the viewpoint of preventing the composition from being dried up during the step of applying the composition, and is more preferably a solvent having a boiling point of 300° C. or lower in order to suppress the generation of voids.

The type of solvent is not particularly limited, and examples thereof include an alcohol solvent, an ether solvent, a ketone solvent, an amide solvent, an aromatic hydrocarbon solvent, an ester solvent and a nitrile solvent. More specific examples include methylisobutyl ketone, dimethylacetamide, dimethylformamide, dimethylsulfoxide, N-methyl-2-pyrrolidone, Y-butyrolactone, sulfolane, cyclohexanone, methylethylketone, dimethylpropaneamide, 2-(2-hexyloxyethoxy) ethanol, 2-(2-ethoxyethoxy) ethanol, 2-(2-butoxyethoxy) ethanol, diethylene glycol monoethyl ether, terpineol, stearyl alcohol, tripropylene glycol methyl ether, diethylene glycol, propylene glycol-n-propyl ether, dipropylene glycol-n-butyl ether, tripropylene glycol-n-butyl ether, 1,3-butanediol, 1,4-butanediol, p-phenylphenol, propylene glycol phenyl ether, tributyl citrate, 4-methyl-1,3-dioxolan-2-one, and paraffin. One type of solvent may be used singly, or two or more types thereof may be used in combination.

From the viewpoints of viscosity, shortening of the time of the heating process and the like, the content of the solvent is preferably from 0.1% by mass to 10% by mass, more preferably from 0.5% by mass to 9% by mass, and further preferably from 1% by mass to 8% by mass, with respect to the total amount of the resin composition.

<Other Additives>

The resin composition may contain other additives as necessary. Examples of an additive include thixotropic agent and a dispersant.

Examples of the thixotropic agent include 12-hydroxystearic acid, 12-hydroxystearic acid triglyceride, ethylene bisstearamide, hexamethylene bisoleamide, N, N'-distearyl adipamide, fumed silica and the like. One type of thixotropic agent may be used singly or two or more types thereof may be used in combination. The content of the thixotropic agent is not particularly limited, and may be from 0.01% by mass to 5% by mass, 0.05% by mass to 3% by mass, or 0.1% by mass to 1% by mass, with respect to the total solid content of the resin composition.

Examples of the dispersant include a dispersant having miscibility with the resin. By using a dispersant having miscibility with the resin, the filler tends to be favorably dispersed, whereby the adhesiveness to the base material tends to be improved. Specific examples of the dispersant include a phosphate, a carboxylate and a carboxylic acid amine salt. The content of the dispersant may be from 0.01% by mass to 5% by mass or from 0.05% by mass to 3% by mass, with respect to the total solid content of the resin composition.

[Use of Resin Composition]

The resin composition of the present disclosure may be dried to be used as a film. The film can be produced, for example, by the following method. First, the above-described resin composition is applied to at least a part of the surface of a base material to form a resin composition layer. Then, the resin composition layer is dried to obtain a film. The method of applying the resin composition to the base material is not particularly limited, and examples thereof include a spray method, a screen printing method, a rotary coating method, a spin coating method and a bar coating method. In particular, the resin composition according to the present disclosure is suitable for applications in which screen printing is employed.

The base material to which the resin composition is applied is not particularly limited, and examples thereof include a glass, a metal, a resin material, a metal vapor-deposited film, a metal oxide, a ceramic, a non-woven fabric, glass fibers, aramid fibers, carbon fibers, a glass fiber prepreg, an aramid fiber prepreg and a carbon fiber prepreg. In particular, the resin composition according to the present disclosure has excellent adhesiveness to a base material having polarity at the surface thereof, such as a glass, a metal, a metal oxide, glass fibers, aramid fibers or a glass fiber prepreg.

The method for drying the resin composition is not particularly limited, and examples thereof include a method in which the resin composition is heat-treated using a device such as a hot plate or an oven, and a method in which the resin composition is allowed to dry naturally. The condition of the heat treatment to dry the resin composition is not particularly limited as long as the condition is sufficient for the solvent in the resin composition to vaporize, and may be approximately 80° C. to 150° C. for 5 minutes to 120 minutes.

The resin composition according to the present disclosure may be used as a cured product. The method for curing the resin composition is not particularly limited, and the resin composition may be cured by, for example, heat treatment. The curing by the heat treatment can be conducted using a box dryer, a hot air conveyor dryer, a quartz tube furnace, a hot plate, rapid thermal annealing, a vertical diffusion furnace, an infrared curing furnace, an electron beam curing furnace, a microwave curing furnace or the like.

From the viewpoint of antifouling property and oil resistance, the maximum height Rz of the film or the cured product is preferably 10.0 μm or less, more preferably 8.0 μm or less, and further preferably 6.0 μm or less.

The arithmetic average roughness Ra of the film or the cured product is preferably 1.5 μm or less, more preferably 1.0 μm or less, further preferably 0.8 μm or less, and particularly preferably 0.6 μm or less.

The arithmetic average roughness Ra and the maximum height Rz of the film or the cured product refer to the values obtained based on JIS B 0601:2013. Specifically, the arithmetic average roughness Ra and the maximum height Rz of the film or the cured product refer to the values measured using a 3D microscope (e.g., VR-3200 manufactured by Keyence Corporation, magnification: 12×).

The thickness of the film or the cured product is not particularly limited, and may be, in an embodiment, from 10 μm to 100 μm or from 10 μm to 50 μm.

The specific gravity of the film or the cured product is preferably 4.0 or higher, more preferably 4.5 or higher, and further preferably 5.0 or higher. The upper limit of the specific gravity of the film or the cured product is not particularly limited, and may be, for example, 9.0 or lower.

From the foregoing viewpoints, the specific gravity of the film or the cured product may be from 4.0 to 9.0, from 4.5 to 9.0, or from 5.0 to 9.0.

The volume resistivity of the film or the cured product is preferably $1.0\times10^6$ Ω·cm or more, more preferably $1.0\times10^7$ Ω·cm or more, and further preferably $1.0\times10^8$ Ω·cm or more. The volume resistivity can be obtained in accordance with JIS C 2139-3-1:2018, by measuring the insulation resistivity using an insulation resistance meter (e.g., 8340A manufactured by Advantest Corporation) and calculating the volume resistivity using the thickness and the contact area of the electrode.

The breakdown voltage of the film or the cured product measured by the method described in the Examples section is preferably 5 MV/m or more, preferably 10 MV/m or more, and further preferably 15 MV/m or more.

The resin composition according to the present disclosure can be particularly suitably used for applications in which formation of an insulation layer having a high specific gravity by screen printing is desired. Further, the resin composition according to the present disclosure can be suitably used as an ultrasound reflection material.

EXAMPLES

Hereinafter, the invention will be described in detail below by way of Examples. However, the invention is not limited to these Examples.

[Preparation of Composition]

The following components were mixed in accordance with the formulations (% by mass) shown in Table 1 to obtain resin compositions.

Resin 1: polyamide-imide resin (KS-9900F (trade name), Hitachi Chemical Company, Ltd.)

Resin 2: epoxy resin (YX8034 (trade name), Mitsubishi Chemical Corporation)

Resin 3: epoxy resin (TG-G (trade name), Shikoku Chemicals Corporation)

Curing agent: imidazole

Tixotropic agent 1: 12-hydroxystearic acid

Tixotropic agent 2: fumed silica (Aerosil R972, Nippon Aerosil Co., Ltd.)

Dispersant: phosphate (BYK-106 (trade name), BYK Japan KK)

Coupling agent 1: N-phenyl-3-aminopropyltrimethoxysilane (KBM-573 (trade name), Shin-Etsu Chemical Co., Ltd.)

Coupling agent 2: 3-glysidoxypropyltrimethoxysilane (KBM-403 (trade name), Shin-Etsu Chemical Co., Ltd.)

Filler: bismuth oxide ($Bi_2O_3$) (a spherical filler having a volume-average particle size of 2.0 μm, specific gravity: 8.9)

[Film Formation]

A 100 mm×100 mm coating film was formed on a soda glass plate having a thickness of 1.0 mm using a screen printing machine (LS-150, Newlong Seimitsu Kogyo Co., Ltd.) and a screen mesh plate (WT360-16, Sonocom Co., Ltd.) at a squeegee speed of 10 mm/sec and a clearance of 1.0 mm. The film formed on the soda glass plate was dried in an oven at 120° C. for an hour to form a film.

[Surface Roughness]

The arithmetic average roughness Ra and the maximum height Rz of the formed film were obtained based on JIS B 0601:2013 using a 3D microscope (e.g., VR-3200 manufactured by Keyence Corporation, magnification: 12×).

[Adhesiveness Evaluation]

In the central part of the formed 100 mm×100 mm film, cuts were made in a grid pattern having a grid width of 8 mm and a grid length of 8 mm using a cross-cutter test multi-blade cutter (Allgood Co., Ltd.) equipped with cutter blades at 1 mm intervals, and then a tape was adhered thereto and peeled off at an angle of 45°, in accordance with JIS K 5600-5-6:1999. The area of the portions of the formed film at which, after the peeling of the tape, the film was detached from the portion of the formed film at which the cuts had been made in a grid pattern was micrographed, and the area of the detached portions was calculated by image processing through banarization of the areas of detached and undetached portions. Films were regarded to have good adhesiveness when the detached area was less than 40% with respect to the entire film formed.

[Insulation Test]

A 100 mm×100 mm coating film was formed on a cupper foil having a thickness of 30 mm using a screen printing machine (LS-150, Newlong Seimitsu Kogyo Co., Ltd.) and a screen mesh plate (WT360-16, Sonocom Co., Ltd.) at a squeegee speed of 10 mm/sec and a clearance of 1.0 mm. The formed coating film was dried in an oven at 120° C. for an hour to form a film. An electrode was connected to the surface of the copper foil, and an 120 mm electrode was placed on the surface of the formed film. The breakdown test was conducted in an atmospheric air at a voltage increase rate of 500 V/s, and the dielectric breakdown strength was calculated based on the breakdown voltage and the thickness of the formed film.

[Measurement of Film Density]

A 100 mm×100 mm coating film was formed on a soda glass plate having a thickness of 1.0 mm using a screen printing machine (LS-150, Newlong Seimitsu Kogyo Co., Ltd.) and a screen mesh plate (WT360-16, Sonocom Co., Ltd.) at a squeegee speed of 10 mm/sec and a clearance of 1.0 mm. The formed coating film was dried in an oven at 120° C. for an hour to form a film. The thickness of the formed film was obtained by taking the average of the thicknesses measured at five points using a micrometer after adjusting the thickness of the glass plate to the value of zero. The density of the film was calculated from Formula (1) based on the thickness $T_0$ (mm) of the formed film, the mass $W_0$ (g) of the glass plate before the film formation, and the mass $W_1$ (g) of the glass plate after the film formation.

$$\text{Density (g/cm}^3) = \{(W_1 - W_0)/(100 \times 100 \times T_0 \times 10^{-3})\} \quad \text{[Formula (1)]}$$

TABLE 1

| Components | Unit | Example 1 | Example 2 | Example 3 | Example 4 | Example 5 | Example 6 | Example 7 |
|---|---|---|---|---|---|---|---|---|
| Resin 1 | % by mass | 2.30 | 2.30 | 2.60 | 2.60 | 5.60 | 4.30 | 4.30 |
| Weight-average molecular weight of Resin 1 | — | 25000 | 25000 | 25000 | 25000 | 25000 | 3000 | 3000 |
| Resin 2 | % by mass | 1.80 | 1.80 | — | — | — | — | — |
| Resin3 | % by mass | 0.10 | 0.10 | — | — | — | — | — |
| Curing agent | % by mass | 0.10 | 0.10 | — | — | — | — | — |
| Thixotropic agent 1 | % by mass | 0.37 | 0.37 | — | — | — | — | — |
| Thixotropic agent 2 | % by mass | — | — | 0.07 | 0.07 | — | 0.07 | 0.07 |
| Dispersant | % by mass | 0.96 | 0.96 | 0.96 | 0.96 | — | 0.96 | 0.96 |
| Coupling agent 1 | % by mass | — | 2.00 | — | 2.00 | — | — | 2.00 |
| Coupling agent 2 | % by mass | 2.00 | — | 2.00 | — | — | 2.00 | — |
| Filler | % by mass (% by volume) | 92.00 (61) | 92.00 (61) | 94.00 (71) | 94.00 (71) | 94.00 (71) | 92.00 (61) | 92.00 (61) |
| Rz | μm | 3.8 | 2.2 | 1.8 | 1.8 | 1.26 | 3.7 | 4.0 |
| Ra | μm | 0.4 | 0.23 | 0.24 | 0.24 | 0.18 | 0.4 | 0.5 |
| Adhesiveness | % | 10 | 4 | 10 | 10 | 15 | 30 | 33 |
| Film density | g/cm³ | 5.4 | 5.4 | 6.7 | 6.7 | 6.7 | 5.4 | 5.4 |
| Breakdown voltage | MV/m | 10 | 20 | 21 | 21 | 20 | 21 | 21 |

The entire disclosure of Japanese Patent Application No. 2019-061202 is incorporated herein by reference. All documents, patent applications, and technical standards described in the present disclosure are herein incorporated by reference to the same extent as if each individual document, patent application, or technical standard was specifically and individually indicated to be incorporated by reference.

The invention claimed is:

1. A resin composition comprising:

bismuth oxide particles; and a resin having a polar group, wherein the content of the bismuth oxide particles is 88% by mass or more with respect to the total solid content of the resin composition.

2. The resin composition according to claim 1, wherein the resin having a polar group comprises a resin having a weight-average molecular weight of 10,000 or more.

3. The resin composition according to claim 1, wherein the polar group comprises at least one hetero atom selected from the group consisting of a nitrogen atom, an oxygen atom and a sulfur atom.

4. The resin composition according to claim 1, wherein the resin having a polar group comprises at least one selected from the group consisting of a polyamide-imide resin, an epoxy resin, an acrylic resin, a polyester resin and a polyether resin.

5. The resin composition according to claim 1, wherein a volume-average particle size of the bismuth oxide particles is 5.0 μm or less.

6. The resin composition according to claim 1, further comprising a coupling agent.

7. The resin composition according to claim 6, wherein the coupling agent comprises a silane coupling agent.

8. The resin composition according to claim 1 further comprising a solvent.

9. The resin composition according to claim 1, wherein the resin having a polar group comprises a polyamide-imide resin.

10. The resin composition according to claim 9, wherein the resin having a polar group comprises a polyamide-imide resin having at least one of a polyalkylene oxide structure or a polysiloxane structure.

11. The resin composition according to claim 1, wherein the resin having a polar group comprises an epoxy resin.

12. The resin composition according to claim 1, wherein the content of the bismuth oxide particles is 92% by mass to 99% with respect to the total solid content of the resin composition.

13. A film formed by drying the resin composition according to claim 1.

14. The film according to claim 13, wherein the film has a maximum height Rz of 10.0 μm or less.

15. The film according to claim 13, wherein the film has an arithmetic average roughness Ra of 1.5 μm or less.

16. An ultrasound reflection material comprising the film according to claim 13.

17. A cured product formed by curing the resin composition according to claim 1.

18. The cured product according to claim 17, wherein the cured product has a maximum height Rz of 10.0 μm or less.

19. The cured product according to claim 17, wherein the cured product has an arithmetic average roughness Ra of 1.5 μm or less.

20. The cured product according to claim 17, wherein the cured product is for use as an ultrasound reflection material.

* * * * *